(No Model.) 2 Sheets—Sheet 2.
T. D. HOSKINS.
STREET CAR MOTOR.
No. 564,618. Patented July 28, 1896.
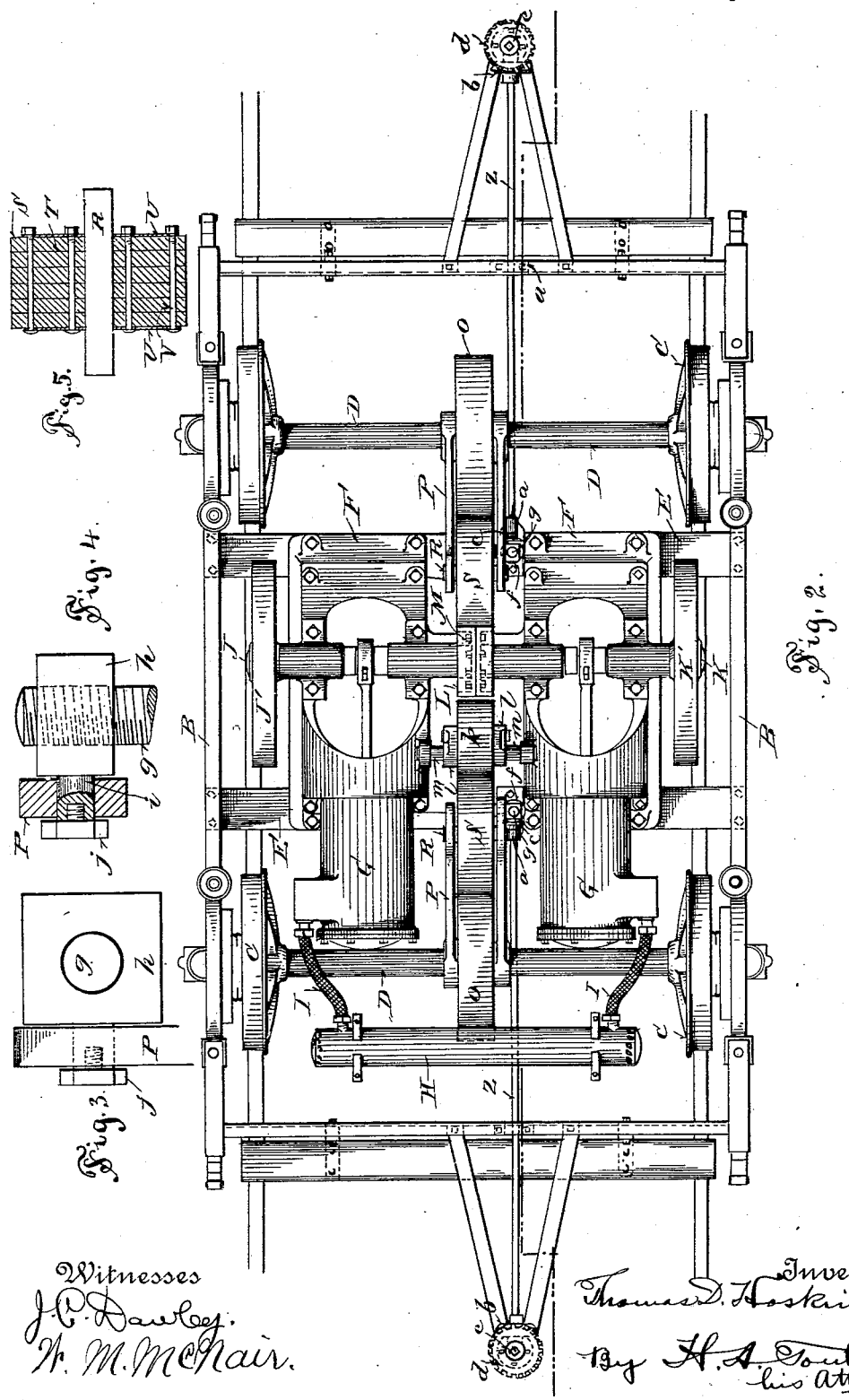
Witnesses
J. C. Dawley.
W. M. McNair.
Inventor
Thomas D. Hoskins,
By H. A. Toulmin,
his Atty.

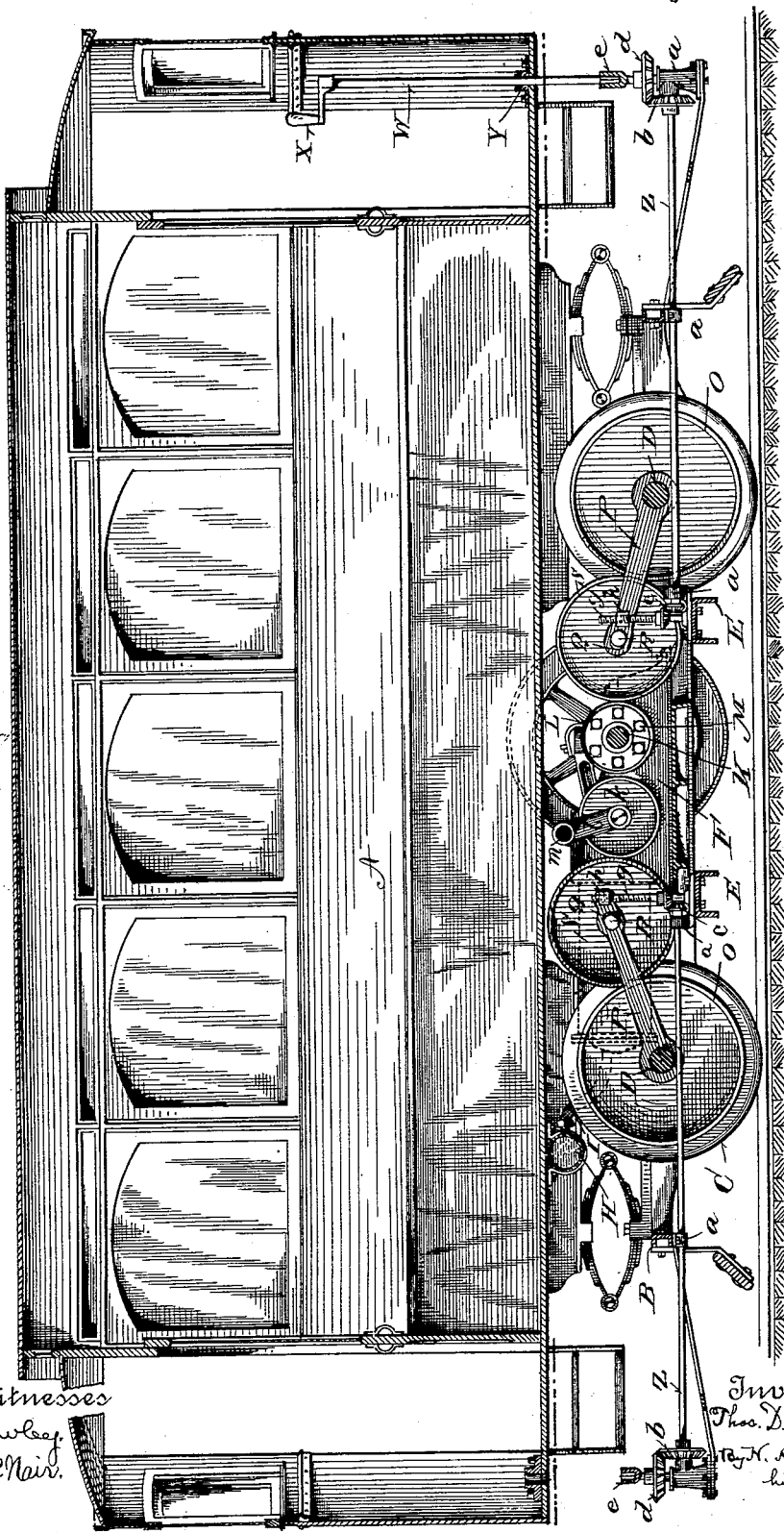

UNITED STATES PATENT OFFICE.

THOMAS D. HOSKINS, OF SPRINGFIELD, OHIO, ASSIGNOR OF ONE-HALF TO JOHN FOOS AND P. P. MAST, OF SAME PLACE.

STREET-CAR MOTOR.

SPECIFICATION forming part of Letters Patent No. 564,618, dated July 28, 1896.

Application filed November 9, 1895. Serial No. 568,447. (No model.)

*To all whom it may concern:*

Be it known that I, THOMAS D. HOSKINS, a citizen of the United States, residing at Springfield, in the county of Clark and State of Ohio, have invented certain new and useful Improvements in Street-Car Motors, of which the following is a specification, reference being had therein to the accompanying drawings.

This invention relates to certain new and useful improvements in street-car motors.

The general object which I have in view is a street-car motor comprising a friction driving-pulley operated by the motor, which is preferably a gas or gasolene engine, a friction-driven pulley operating the ground-wheels, and a friction transmitting-pulley combined with mechanism operative from the motorman's place on the car and arranged to engage the transmitting-pulley with the others and to disengage it therefrom, so as to apply or not apply the motive power whether the car is standing or in motion.

Another object of my invention is to combine a friction driving-pulley which rotates continuously in one direction with a friction-driven pulley on each side thereof, a friction transmitting-pulley between one driven pulley and the driving-pulley, and a friction transmitting-pulley and a friction idler-pulley, both located between the other driving-pulley and the driven pulley, whereby a gas-engine or other motor may be kept in continuous motion in the same direction, and yet the car may be run in either direction. Thus when such engine is once started it need not be stopped and be restarted in the opposite direction, which, by reason of the nature of such engine, is seriously objectionable because necessitating manual labor on the part of the motorman in restarting it.

Another object of my invention is to combine with a friction driving-pulley and a friction-driven pulley, the latter operating the ground-wheels, a self-adjusting friction transmitting-pulley and mechanism operative from the motorman's place on the car to engage and disengage the transmitting-pulley from the others, the self-adjustment of such transmitting-pulley acting to bring it into contact with both of the others, thus avoiding the necessity of mechanism so perfect that such transmitting-pulley could be brought into contact with both the driving and driven pulleys, and yet be capable of disengagement and of variable pressure-contact between it and the driving and driven pulleys.

Another object of my invention is to make this self-adjusting friction transmitting-pulley of material which will yield slightly, so as to compensate for the variation in the relative positions of the driving and driven pulleys, due to the vibration of the framework caused by traveling over a road-bed.

In the accompanying drawings, on which like reference-letters indicate corresponding parts, Figure 1 is a vertical sectional view of an ordinary street-car and a partial side elevation and sectional view of my motor apparatus; Fig. 2, a plan view of the truck and my said motive apparatus with the car-body removed; Fig. 3, a detailed view of the swiveled nut and transmitting-pulley arm; Fig. 4, another view of the same with the operating-screw, and Fig. 5 a detail view of one form of transmitting-pulley of yielding material.

The letter A designates a street-car of the ordinary or any approved type mounted upon a truck-frame B, also of any approved pattern, being preferably made of angle-iron to increase its strength and rigidity. This frame is in turn mounted, as usual, upon car-wheels C, having axles D. I secure to the frame B stout cross-bars E, upon which latter I mount and secure engine beds or frames F, of which there are two. These frames carry cylinders G of any approved type of gas or gasolene engine. A gasolene-tank H is shown secured to the bottom of the car and connected with the engine valve-chest by a flexible pipe I to compensate for the vibrations between the car and the truck-frame. These gas or gasolene engines are of any approved make, but I have shown only so much of such engines as is necessary to make plain my invention, omitting detail features of such engines, which will vary according to the make. In the beds F are mounted driving-shafts J and K with fly-wheels J' and K', which shafts coupled together at their meeting ends by the friction driving-pulley L, constructed in sections with their ends abutting and secured together by bolts and nuts M. Thus the friction driving-pulley may be applied to the shafts without regard to the other devices that, in the different makes of gas or gasolene engines, may be also carried by such shafts. The two shafts are thus one in effect after the sections of the driving-pulley are united.

Each axle D is provided with a friction-driven pulley O, and arms P are mounted on the axles, one on each side of such pulleys. These arms have slots Q near their free ends, in which slots are mounted the shafts R of the friction transmitting-pulleys S. Thus the pulleys S become self-adjusting in their relation to the driving-pulley L and the driven pulleys O, and will settle down firmly and equally against both of such pulleys notwithstanding that they are controlled by the arms P, which turn on the axles D. These friction transmitting-pulleys S are also preferably constructed so as to yield slightly to accommodate themselves to the slight movement of the driving-shaft to and from the axles by reason of the vibration of the truck-frame of the cars, caused by unavoidable inequalities in the road-bed. In Fig. 5 I have illustrated one form of such friction-pulley, the same consisting of a series of paper sheets T, bound together by metal plates U and rods V.

The arms P are swung up and down, and the degree of pressure of the transmitting-pulleys against the driven and driving pulleys is controlled by mechanism operative from the motorman's place on the car. One form of this mechanism consists of a hand-shaft W with its crank X removably mounted in a journal Y on the car-platform, so as to be transferred by the motorman from one end of the car to the other, and of a shaft Z, mounted in suitable bearings $a$ on the truck-frame and beams E. The shaft Z carries miter-wheels $b$ and $c$, which mesh, respectively, with miter-wheels $d$ on a socket-shaft $e$ and $f$ on a screw $g$. The shaft $e$ is rotated by the hand-shaft W, and thus the shaft Z is rotated and made to revolve the screw $g$, which has the effect of raising or lowering the arms P by working in a nut $h$, swiveled to one of the arms P, as more clearly shown in the detail Figs. 3 and 4, where a trunnion $i$ forms a swivel-joint and is kept from working out of the arm P by a nut $j$.

Thus it will be seen that the motorman from his position on the car can apply the power to the car or cut it off from the car, and that he has control over the friction transmitting - pulleys S whether the car is standing or moving. It will also be seen that he can draw the pulleys S into more or less severe contact with the driving and driven pulleys should occasion require. Thus in going downhill he can instantly relieve the car of the power of the engine, although the engine will continue to rotate the driving-pulley.

I have above stated that the engines which I prefer, by reason of being gas or gasolene engines, are to run continuously in one direction to save the labor and time of restarting them by manual assistance in a reverse direction, which manual assistance is a necessary incident to starting gas-engines. Therefore, in order to run the car in either direction with a driving-pulley always rotating in the same direction, I have embodied in my system of pulleys a loose pulley $k$, which is hung on arms $l$ from a shaft $m$, mounted in bearings on the beds F. These arms $l$ tend to swing downward with the pulley $k$, and thus maintain the pulley constantly in contact with the adjacent transmitting-pulley S, but out of contact with the driving-pulley L. To bring the pulley $k$ in contact with the pulley L, the transmitting-pulley S is brought down into place. Thus it will be seen that the car may be run in either direction, although the driving-pulley runs in but one direction. It will also be seen that both of the transmitting-pulleys S tend to be drawn downward directly by the driving-pulley L as to one of them and directly by the loose pulley $k$ as to the other of them, and that such downward draft or tendency on the pulleys S tends to increase their frictional pressure against the other pulleys.

Thus it will be seen that my invention provides for the utilization of gas or gasolene engines as motors for street-cars by the employment of an organization of pulleys and the necessary actuating or controlling mechanism, which gives the operator perfect control over the car and performs all those necessary practical functions required in carrying out the actual running of street-cars.

While I have described gas-engines as the kind of motors to be used, it will be understood that any means by which rotary motion is given to the driving-pulley will come within the scope of my invention if the other elements embraced in my claims are present.

Having thus fully described my invention, what I claim as new, and desire to secure by Letters Patent, is—

1. In a street-car motor, the combination with a friction driving-pulley and a friction-driven pulley connected with the car-wheels, arms pivotally mounted on the car-axle with slots near one end, a friction transmitting-pulley having its shaft mounted in said slots, a controlling means consisting of a hand-shaft on the motorman's place, a screw-shaft connected with one of the arms and two other shafts geared together, one of them operated by the hand-shaft and the other also geared to the screw-shaft.

2. In a street-car motor, the combination with a friction driving-pulley rotatable in one continuous direction, of friction-driven pulleys connected with each set of the car-wheels, a friction transmitting-pulley working from said driving-pulley to one of the driven pulleys, and a friction transmitting-pulley and a friction loose pulley working from said driving-pulley to the other driven pulley and controlling means connected to the mountings of each of said transmitting-pulleys, and adapted to be operated from either end of the car.

3. A street-car motor embracing the following instrumentalities: two gas-engines operating a friction driving-pulley in one continuous direction, a friction-driven pulley connected with each set of car-wheels, arms pivoted to each car-axle and having slots, shafts mounted in said slots and having each a friction transmitting-pulley thereon, one of said latter pulleys being adapted to make direct frictional contact with said driving-pulley, and a friction loose pulley between said other transmitting-pulley and said driving-pulley, a screw-shaft connected to an arm on each axle, a shaft geared to each screw-shaft, a third shaft geared to the latter and a hand-shaft to operate said second shaft.

In testimony whereof I affix my signature in presence of two witnesses.

THOMAS D. HOSKINS.

Witnesses:
OLIVER H. MILLER,
W. M. MCNAIR.